Nov. 2, 1965   J. J. SCANLON, JR   3,215,933
SCREENS FOR USE IN A SMALL PROJECTILE VELOCITY MEASURING SYSTEM
Filed April 11, 1962
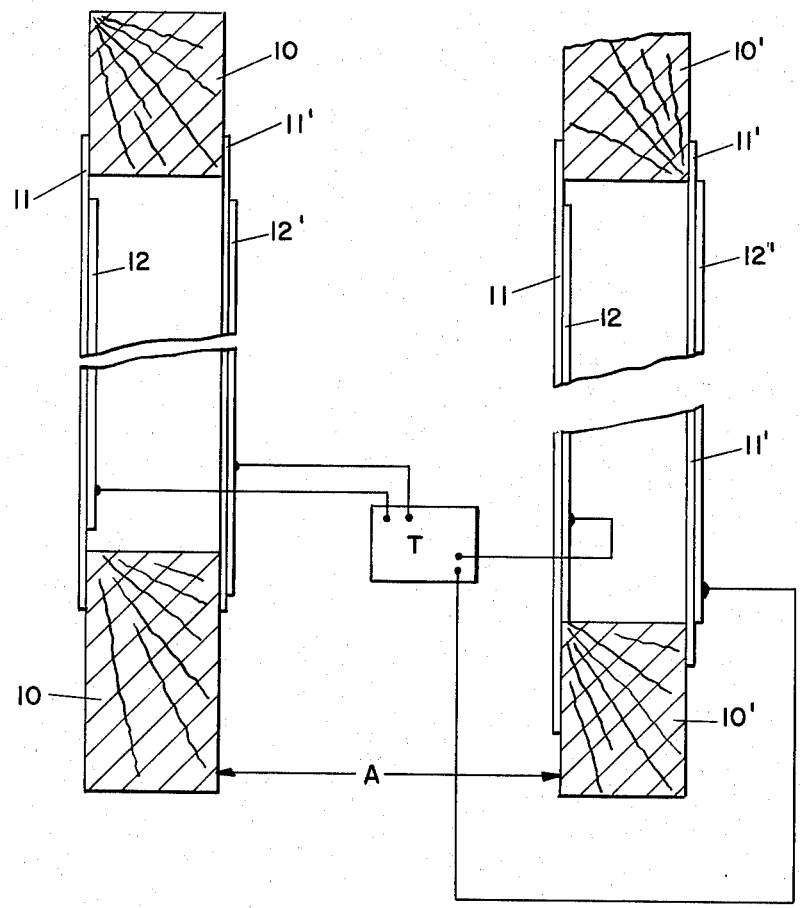
INVENTOR.
JOHN J. SCANLON, JR.
BY
ATTORNEYS.

United States Patent Office 3,215,933
Patented Nov. 2, 1965

3,215,933
SCREENS FOR USE IN A SMALL PROJECTILE VELOCITY MEASURING SYSTEM
John J. Scanlon, Jr., Levittown, N.J., assignor to the United States of America as represented by the Secretary of the Army
Filed Apr. 11, 1962, Ser. No. 187,178
3 Claims. (Cl. 324—70)
(Granted under Title 35, U.S. Code (1952), sec. 266)

The invention described herein may be manufactured and used by or for the Government for governmental purposes without the payment to me of any royalty thereon.

This invention relates to screens for use in a small caliber projectile, velocity measuring system and has for an object to provide a screen suitable for use with small dart type projectiles when the usual accurate timing device is used.

Heretofore there have been three systems for measuring the speed of hyper-velocity projectiles. One of said systems is the use of screens with printed circuit paper having lines spaced closer together than the projectile diameter but this system is objectional because only one projectile can be fired through such paper. Another system places two metal foils not more than the length of the projectile apart but this system is also objectionable because of the formation of splinters which cause the recording of false velocities. A third system has two thin layers of aluminum secured to a thin plastic sheet for closing a circuit as or after a projectile has passed through the sheet thereby permitting the two foil layers to touch. The disadvantage of this last mentioned system is the need for 400 volts required for operation and about 800 volts to supply a heavier current for burning the aluminum foil layers apart where they contact and stick together.

A thin foil when mounted in a supporting frame has been open to two serious objections. If lightly stressed there is a tendency to shatter and where that objection has been overcome, it has been found that with the screens spaced close enough together there is danger of a thin piece of foil bridging the distance to an adjacent screen and requiring the supply of enough electrical energy to burn off those bridging pieces of foil. When a thin onion-skin type of paper is used, so as not to slow up the projectile objectionably, it becomes too weak to support both itself and the foil when stretched tight enough so as not to cause an excessive bulge.

According to this invention an onion-skin type thin paper of about .0015 to .0025 inch in thickness is coated on one side with silver electrically conductive paint known as Du Pont concentrate No. 5326 and diluted 4 to 2 with toluene. Where the conductive paint penetrates the paper foundation, as often happens, it has been found desirable to coat the side of the paper opposite the conductive coat with a plastic electrical insulating coating of nitrocellulose plasticized to make it more elastic than is the metal layer on the opposite face and thus prevent any circuit being closed between the conductive faces of the two sheets of either pair except through the metal of the projectile.

Referring to the drawings, the single figure shows a preferred embodiment of the present invention wherein wooden frames 10 and 10' are spaced about 10 feet or more apart as is indicated by A. Each frame has a sheet of onion-skin thin paper 11 and 11' clamped or adhesively secured to each face or side of the frame. On the right side of each thin paper is a metallic or conductive layer 12 and 12' supported by the thin paper. A timing device T contains a source of current and is connected to the conductive layers 12 and 12' of each of the screens made up of the paper or electrical non-conductive material 11 and 11' and the conductive layers 12 and 12' on the side toward an on-coming projectile. On contact by a projectile current flows between the conductive layer 12' of one screen and the same layer 12 on an adjacent screen which is spaced less than the length of a projectile from the first mentioned screen so that current flows through the metal body of a projectile to first effect an initiation of the timing device T. When the projectile reaches the pair of screens on the left in the drawing, its passage through these screens closes a circuit to stop operation of the timing device T. This timing device and its circuit connections being a part of the prior art are no part of the present invention.

The layer of plastic insulating material on the sides of the paper opposite conductive layer has not been shown in the drawing due to its being much thinner than the paper 11. Actually the conductive coating is thinner than the comparative size for it shown in the drawing. An approximate thickness for the conductive paint layer when dried is about .0005 inch and about the same thickness is desired for the plastic layer when dried. Thin conductive coatings applied in liquid form are also suitable in place of the conductive paints.

While a silver paint is preferable due to its conductivity, paints made from copper or aluminum have been found satisfactory. The fact that metal foils of greater thinness have been produced render their use being available for adherence to a non-conductive foundation. The thin onion-skin paper nevertheless should preferably possess the ability to reinforce the thin metal layer in strength to prevent shattering of the metal and to be more elastic than the metal layer. With the plastic more elastic than the conductive layer, the paper not only supports the metal layer but seems to have an ability to reduce shattering or powdering of the metal layer. A preferred plastic coating for the rear face of the paper includes a 5% acrylic resin with a 55% chlorinated aromatic hydrocarbon in a solvent of about 40% fluorinated aromatic hydrocarbon. Plastic layers for use instead of paper include: cellulose acetate, polyethylene, polypropylene, acrylic resin, or a polyethylene terephthalate (polyester) known as Mylar.

A chief advantage of the present invention is the provision of a paper screen for light weight projectiles which will not objectionably slow down the projectile velocity but yet will have an electrically conductive material on one face and an electrically insulating surface on an opposite face.

I claim:
1. In a device for measuring the velocity of a projectile, a pair of spaced apart frames, a pair of conductive screens attached to each of said frames, each pair of screens being spaced apart less than the length of the projectile whose velocity is being measured, a timing device for measuring the time for projectile travel between said pair of frames, an electric circuit closed by a penetrating projectile for starting the operation of said timing device, another electric circuit closed by the same projectile for stopping the operation of said timing device after it has passed between said pair of frames, each of said conductive screens having a flexible electrically nonconductive foundation of not more than .0025 inch in thickness, a layer of an electrically con- ductive paint on a side thereof toward an oncoming projectile and a thin plasticized insulating coating on the opposite side thereof.

2. A device of the type described in claim 1, wherein said thin plasticized insulating adhesive coating is provided on an onion-skin type of paper and on a side of the onion skin type of paper away from an oncoming projectile.

3. A combination according to claim 2 in which said paper is between said adhesive coating and said metal coating.

References Cited by the Examiner

UNITED STATES PATENTS

| | | | |
|---|---|---|---|
| 2,188,339 | 1/40 | Dunham | 273—102.2 |
| 2,576,960 | 12/51 | McAvoy | 273—102.2 |
| 2,819,084 | 1/58 | Brown et al. | 273—102.2 |
| 2,819,085 | 1/58 | Brown et al. | 273—102.2 |

WALTER L. CARLSON, *Primary Examiner.*

FREDERICK M. STRADER, *Examiner.*